(No Model.)
A. J. BATES.
CULTIVATOR FOR BRICK YARDS.
No. 413,482. Patented Oct. 22, 1889.
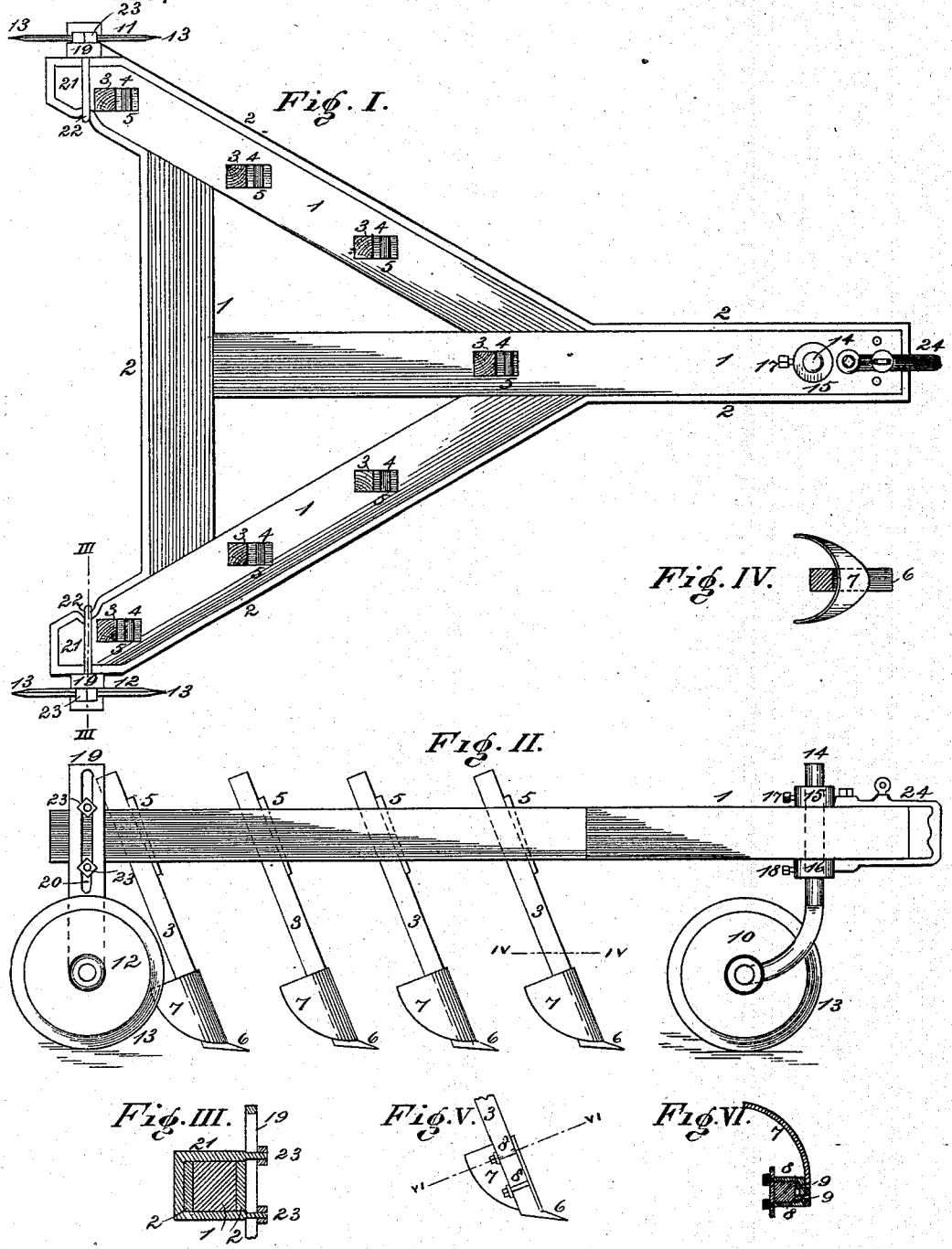

UNITED STATES PATENT OFFICE.

ANDREW J. BATES, OF SUMMUNDUWOT, KANSAS.

CULTIVATOR FOR BRICK-YARDS.

SPECIFICATION forming part of Letters Patent No. 413,482, dated October 22, 1889.

Application filed March 25, 1889. Serial No. 304,618. (No model.)

*To all whom it may concern:*

Be it known that I, ANDREW J. BATES, of Summunduwot, in the county of Wyandotte and State of Kansas, have invented a certain new and useful Improvement in Cultivators for Brick-Yards, of which the following is a full, clear, and exact description, reference being had to the accompanying drawings, forming a part of this specification, and in which—

Figure I is a top view of my improved cultivator. Fig. II is a side view. Fig. III is a transverse section taken on line III III of Fig. I. Fig. IV is a transverse section taken on line IV IV of Fig. II. Fig. V is a detail view showing manner of attaching the mold-boards. Fig. VI is a transverse section taken on line VI VI of Fig. V.

My invention relates to a device for cultivating or loosening up the earth in brick-yards; and my invention consists in features of novelty hereinafter described, and pointed out in the claims.

Referring to the drawings, 1 represents the frame, which is re-enforced by means of strap-iron 2.

3 represents the standards, which are secured to the frame 1 by inserting them in openings 4 in the frame, where they are adjustably held by means of wedges 5. The standards 3 are provided at their lower extremities with elongated points 6.

7 represents mold-boards attached to the standards 3 by means of U-shaped clamps 8. (See Figs. V and VI.) The clamps 8 are secured to the mold-boards by means of countersunk bolts 9. (See Fig. VI.) The front standard, which is secured in the center of the frame, is provided with a double mold-board, (see Fig. IV,) by which means the dirt is thrown both ways. The standards attached to the wings of the frame are provided with single mold-boards, (see Figs. V and VI,) by which means the dirt is thrown outward.

The frame is supported and travels on disks or wheels 10 11 12, the wheels being formed with cutting-edges 13. The front wheel 10 is what is termed a "caster-wheel," said wheel being adjustably secured to the frame 1 by means of a shaft 14, which is journaled at its lower end to the wheel. The upper end of the shaft passes through an opening in the frame and is held therein by means of collars 15 16 and set-screws 17 18. It will be seen that by this means the shaft can be readily adjusted vertically, and will at the same time be left free to turn in the frame when there is a side pressure against the wheel 10. The rear wheels 11 12 are journaled to uprights 19, said uprights being provided with vertical slots 20.

21 represents U-shaped clamps which pass around the rear ends of the frame, the inner ends of the clamps fitting into notches 22 in the frame. The outer ends of the clamps extend through the slots 20 in the uprights 19, where they are adjustably secured by means of nuts 23.

24 represents the draft-clevis.

By means of having the points 6 on the standards, instead of having them on the landside, and having the mold-boards secured by clamps passing around the standards, instead of being secured by bolts passing through the standards, I am enabled as often as the points become dull to remove the mold-boards from the standards, and by heating the standards they can be hammered and drawn out and a new point formed without having to add new material and not having any holes in the standards to interfere in so doing.

I claim as my invention—

1. In a cultivator, the combination of a frame, standards secured to the frame, elongated points on said standards, and convex mold-boards secured to the standards above the points 6, by means of the clamps 8, substantially as described, and for the purpose set forth.

2. In a cultivator, the combination of the frame 1, cutting-wheels 11 12, uprights 19, journaled to the wheels, said uprights being provided with slots 20, and clamps 21, engaging in the slots 20, substantially as described, and for the purpose set forth.

3. In a cultivator, the combination of the frame 1, re-enforcing strap 2, cutting-wheels 11, 12, and 13, uprights 19, provided with slots 20, clamps 21, and notches 22 in the re-enforcing strap 2, in which the clamps rest, substantially as described, and for the purpose set forth.

ANDREW J. BATES.

Witnesses:
JAS. E. KNIGHT,
M. H. KNIGHT.